United States Patent [19]

Takagi

[11] Patent Number: 5,402,201
[45] Date of Patent: Mar. 28, 1995

[54] AUTOMATIC FLASH CONTROL DEVICE OF CAMERA

[75] Inventor: Tadao Takagi, Yokohama, Japan

[73] Assignee: Nikon Corporation, Tokyo, Japan

[21] Appl. No.: 92,525

[22] Filed: Jul. 16, 1993

[30] Foreign Application Priority Data

Jul. 22, 1992 [JP] Japan .................. 4-195493
Mar. 12, 1993 [JP] Japan .................. 5-078724

[51] Int. Cl.6 .......................................... G03B 15/05
[52] U.S. Cl. .................................... 354/415; 354/480
[58] Field of Search ............... 354/413, 415, 431, 480

[56] References Cited

U.S. PATENT DOCUMENTS

| | | | |
|---|---|---|---|
| 5,006,879 | 4/1991 | Takagi et al. | 354/413 |
| 5,164,759 | 11/1992 | Yasukawa | 354/415 |
| 5,168,300 | 12/1992 | Yasukawa | 354/415 |
| 5,172,157 | 12/1992 | Takagi | 354/415 |
| 5,218,397 | 6/1993 | Takagi | 354/415 |
| 5,221,941 | 6/1993 | Matsui et al. | 354/415 |
| 5,227,836 | 7/1993 | Yasukawa | 354/415 |
| 5,231,447 | 7/1993 | Takagi | 354/415 |
| 5,231,448 | 7/1993 | Sato et al. | 354/431 |

FOREIGN PATENT DOCUMENTS 4-355733 12/1992 Japan .

Primary Examiner—Russell E. Adams
Attorney, Agent, or Firm—Shapiro and Shapiro

[57] ABSTRACT

An automatic flash control device of a camera includes a flashing source for performing preliminary flashing and main flashing, a first photodetector for measuring a light beam reflected by an object field and reflected by a shutter curtain via a taking lens upon preliminary flashing from the flashing source before exposure, and a second photodetector for measuring a light beam reflected by the object field and reflected by a film surface via the taking lens upon main flashing from the flashing source during exposure. In this device, the displacement between photometry areas caused by the different positions of the shutter curtain and the film surface is corrected, and the identity between object field areas to be measured in the preliminary flashing mode and the main flashing mode can be assured.

11 Claims, 9 Drawing Sheets

AUTOMATIC FLASH CONTROL DEVICE OF CAMERA

BACKGROUND OF THE INVENTION

1. Field of the Invention

The present invention relates to an automatic flash control device of a camera, which device divisionally measures flashing light emitted from a flashing means.

2. Background of the Invention

As a conventional device of this type, a device disclosed in Japanese Laid-Open Patent Application No. 3-68928 filed by the present applicant is known.

Before exposure, this device causes a flashing means to perform preliminary flashing, divisionally measures a light beam reflected by an object field and then reflected by a shutter curtain, and determines flashing control conditions for main flashing. Thereafter, during exposure, the device causes the flashing means to perform main flashing, divisionally measures a light beam reflected by an object field and then reflected by a film surface, and performs flash control under the conditions determined in the preliminary flashing mode, thus performing proper exposure.

However, in the conventional device described above, since the photometry operation in the preliminary flashing mode is performed using light reflected by the shutter curtain, and the photometry operation in the main flashing mode is performed using light reflected by the film surface, a photometry area is displaced due to a difference between the positions of the shutter curtain and the film surface, and the identity between the photometry areas in the preliminary and main flashing modes is disturbed. The adverse effect of the displacement on flash control becomes more serious as the photometry area is segmented more. This will be described in detail below.

FIG. 5 is a sectional view of a camera having a conventional automatic flash control device.

In a finder observation mode, a light beam from an object field, which passed through a taking lens 3 and an aperture 4 in a taking lens barrel 2, and was reflected by a main mirror 5 (in a state indicated by a dotted line) in a camera main body 1, passes through a screen 6, a pentagonal prism 7, and an eyepiece lens 8, and reaches the eye of a photographer.

Some light components of the light beam emerging from the pentagonal prism 7 pass through a focusing lens 9 for stationary light photometry, and reach a photometry element 10 for stationary light photometry. The photometry element 10 is a divisional photometry type element for performing a photometry operation while dividing an object field into five areas.

When a photographer depresses a shutter button (not shown), the main mirror 5 escapes from the dotted line position to a solid line position, and the aperture 4 is stopped down in accordance with an exposure value which is calculated based on a photometry value measured by the photometry element 10. Then, a flashing device 11 performs preliminary flashing.

The preliminary-flashing light is reflected by an object field, passes through the taking lens 3 and the aperture 4, is reflected by a curtain of a shutter 12, passes through a focusing lens 13 for flashing photometry, and reaches a divisional photometry type photometry element 14 for flashing photometry. The focusing lens 13 and the photometry element 14 will be described in detail later with reference to FIG. 6.

A photometry area, a correction amount of a photometry level, and the like in the main flashing mode are determined from the photometry result of the preliminary-flashing light.

Then, the shutter 12 is opened, and the flashing device 11 performs main flashing. The main-flashing light beam, which was reflected by an object field and passed through the taking lens 3 and the aperture 4, reaches a film surface 15. Thus, the film is exposed, and some light components reflected by the film surface 15 reach the photometry element 14 via the focusing lens 13.

FIG. 6 is a perspective view showing the details of the focusing lens 13 and the photometry element 14.

The photometry element 14 is divided into five light-receiving portions 14a to 14e, and performs a photometry operation while dividing the film surface 15 into five areas 15a to 15e, as shown in FIG. 6.

The focusing lens 13 is constituted by three lenses 13a to 13c. The lens 13a is arranged to allow the light-receiving portion 14a to measure the area 15a, the lens 13b is arranged to allow the light-receiving portions 14b and 14d to measure the areas 15b and 15d, and the lens 13c is arranged to allow the light-receiving portions 14c and 14e to measure the regions 15c and 15e.

FIG. 7 is a view showing a flashing photometry optical system. Assume that the angle between an optical axis 16 of the focusing lens 13 and an optical axis 17 of the taking lens 3 is represented by $\theta$, and a crossing point A between the two optical axes is defined as the central position on the film surface. If the shutter curtain 12 is located in front of the film surface 15 to be separated by a distance d1, a crossing point B between the optical axis 16 and the shutter curtain 12 is displaced toward the bottom side by a distance d2 from the optical axis 17. The distance d2 is given by:

$$d2 = d1 \times \tan \theta$$

Since, in general, d1=3 mm and $\theta$=45°, d2 is about 3 mm.

Therefore, the photometry area in a shutter curtain photometry mode indicated by a dotted circle and the photometry area in a film surface photometry mode indicated by a solid circle are displaced from each other by about d2=3 mm.

This displacement poses a very serious problem when the photometry operation is performed while dividing the central position finely, as shown in FIG. 9. Central small area portions are used in photometry operations of different areas in the shutter curtain photometry mode and in the film surface photometry mode.

SUMMARY OF THE INVENTION

The present invention has been made in consideration of the above situation, and has as its object to provide an automatic flash control device of a camera, which can correct the displacement of a photometry area caused by a difference between the positions of a shutter curtain and a film surface, and can assure identity between photometry areas of a preliminary flashing mode and a main flashing mode.

In order to achieve the above object, according to the present invention, there is provided an automatic flash device of a camera, including flashing means, first photometry means causing the flashing means to perform preliminary flashing before exposure, and measuring a light beam reflected by an object field, and reflected by a shutter curtain via a taking lens, and second photometry means for causing the flashing means to perform main flashing during exposure, and measuring a light beam reflected by the object field, and reflected by a film surface via the taking lens.

DETAILED DESCRIPTION OF THE PREFERRED EMBODIMENTS

The preferred embodiment of the present invention will be described hereinafter with reference to FIGS. 1 to 4.

Figure 1:
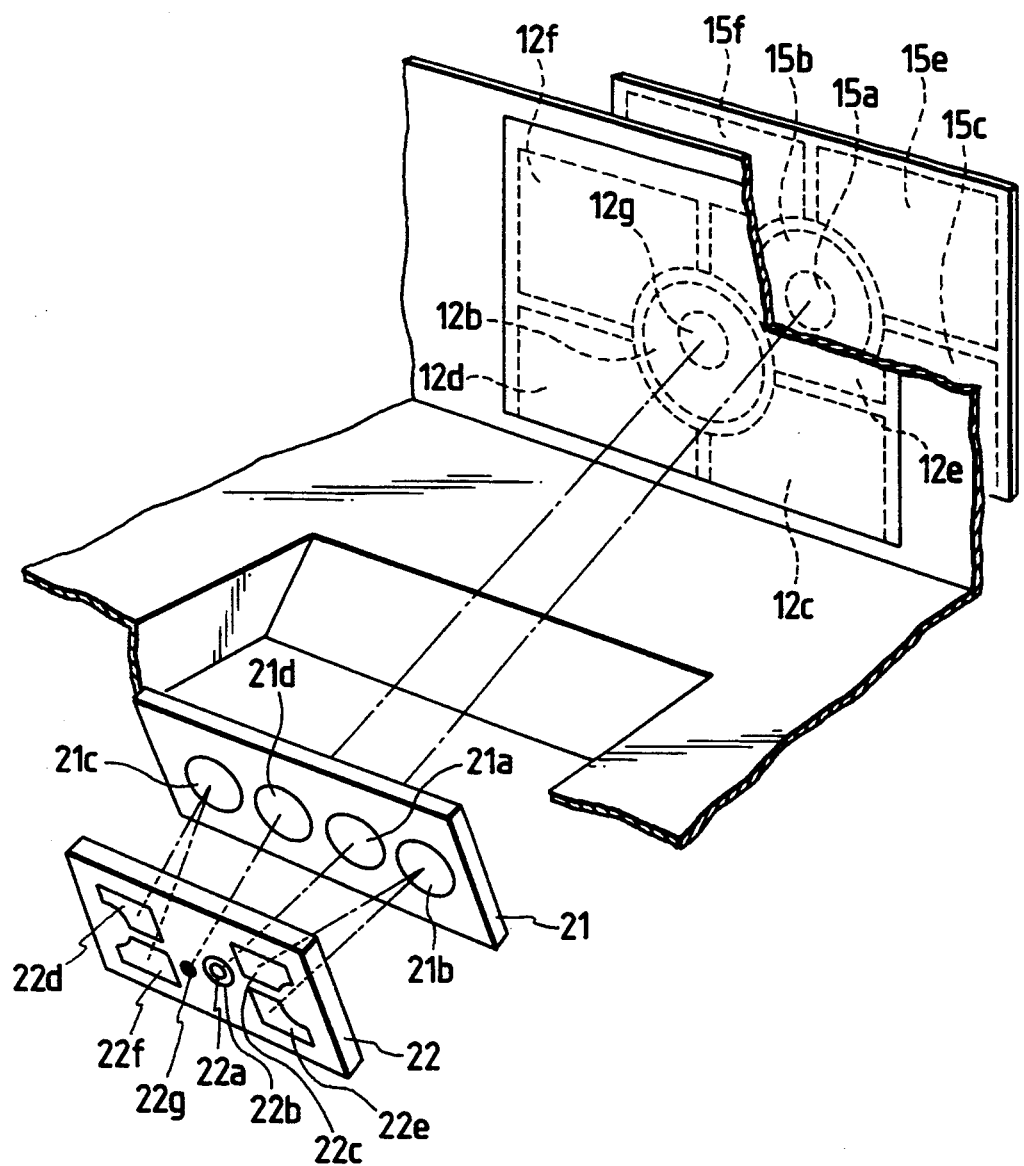
FIG. 1 is a perspective view showing a photometry optical system according to the first embodiment of the present invention.
Figure 2A:
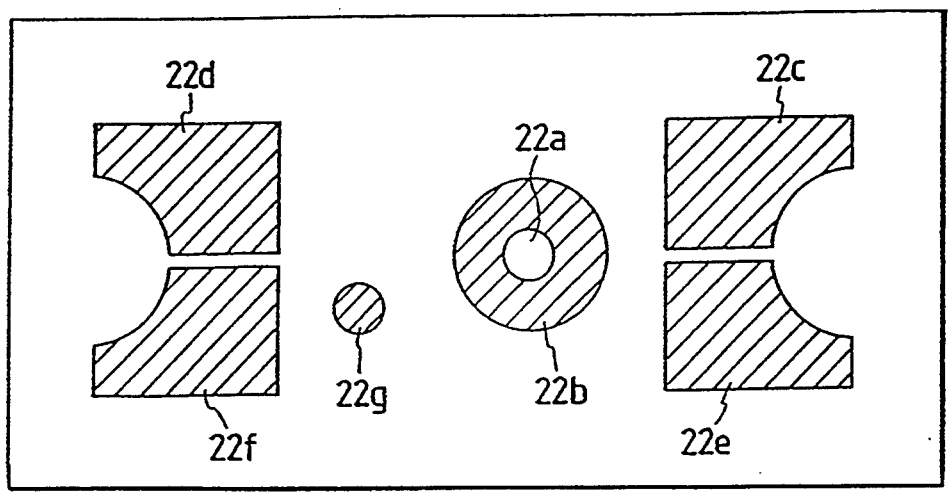
FIGS. 2A and 2B are plan views summarizing light-receiving portions to be used in a photometry mode for light reflected by a shutter curtain and a photometry mode for light reflected by a film surface.
Figure 2B:
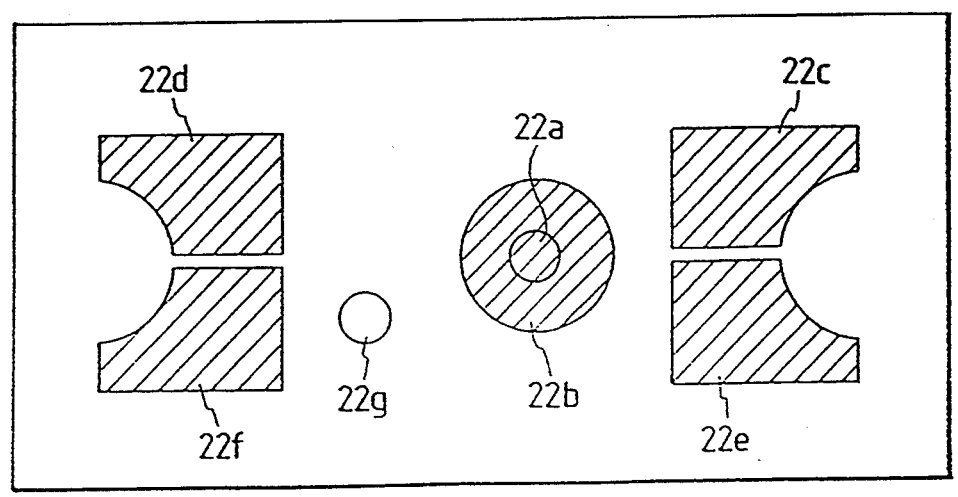
Figure 3:
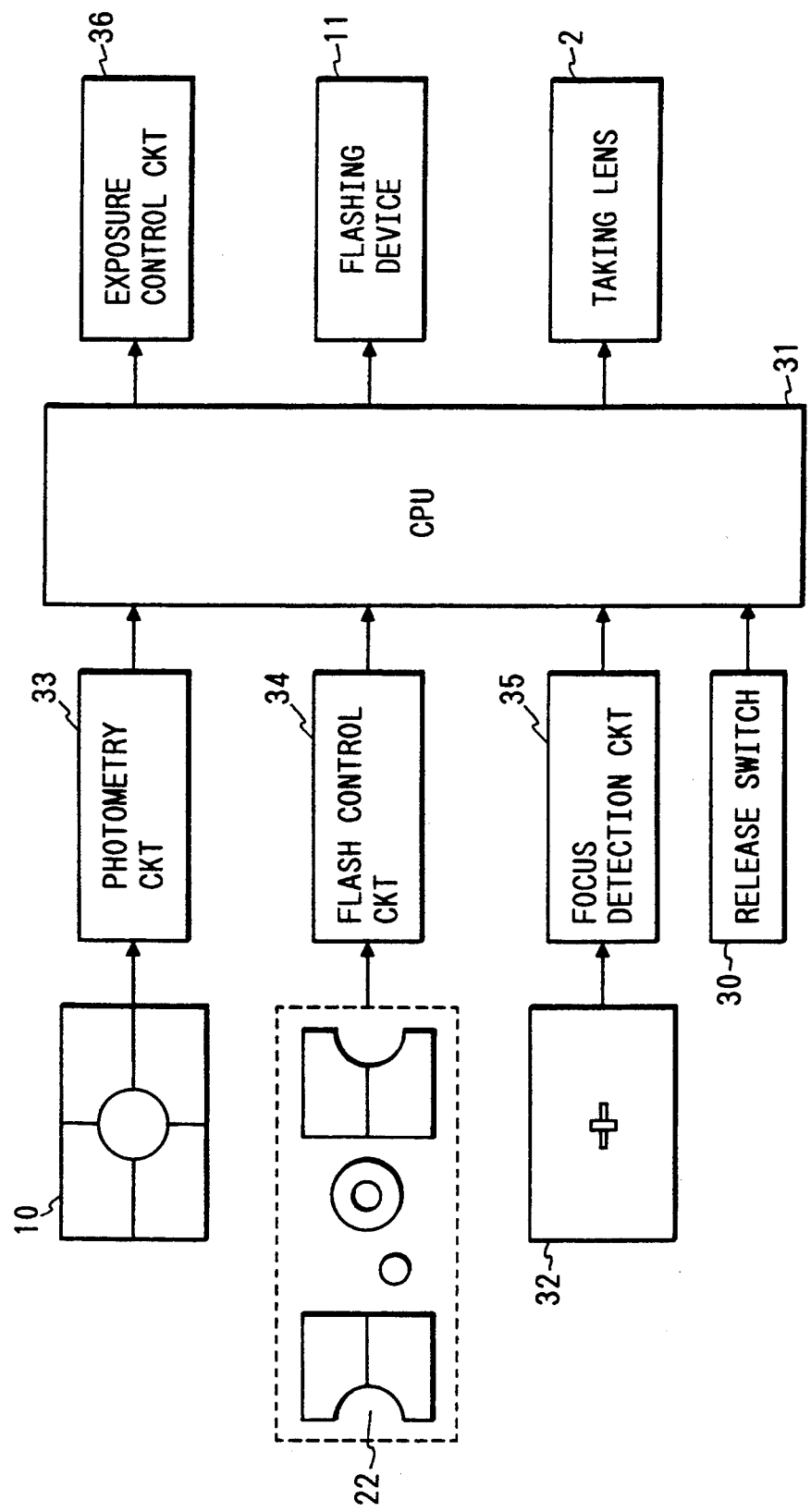
FIG. 3 is a block diagram showing a circuit according to an embodiment of the present invention.
Figure 4:
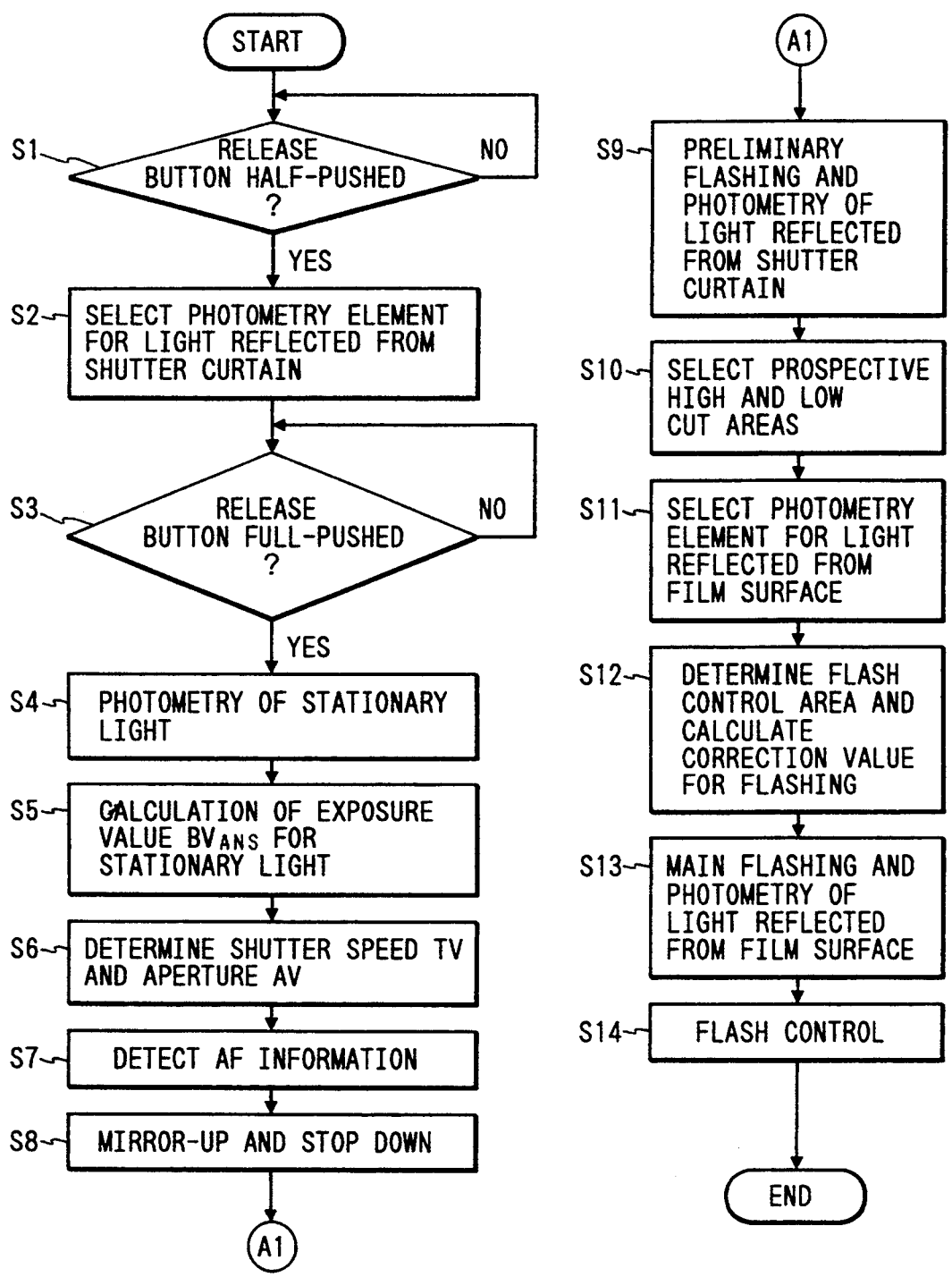
FIG. 4 is a flow chart showing an algorithm of a CPU shown in FIG. 3.
Figure 5:
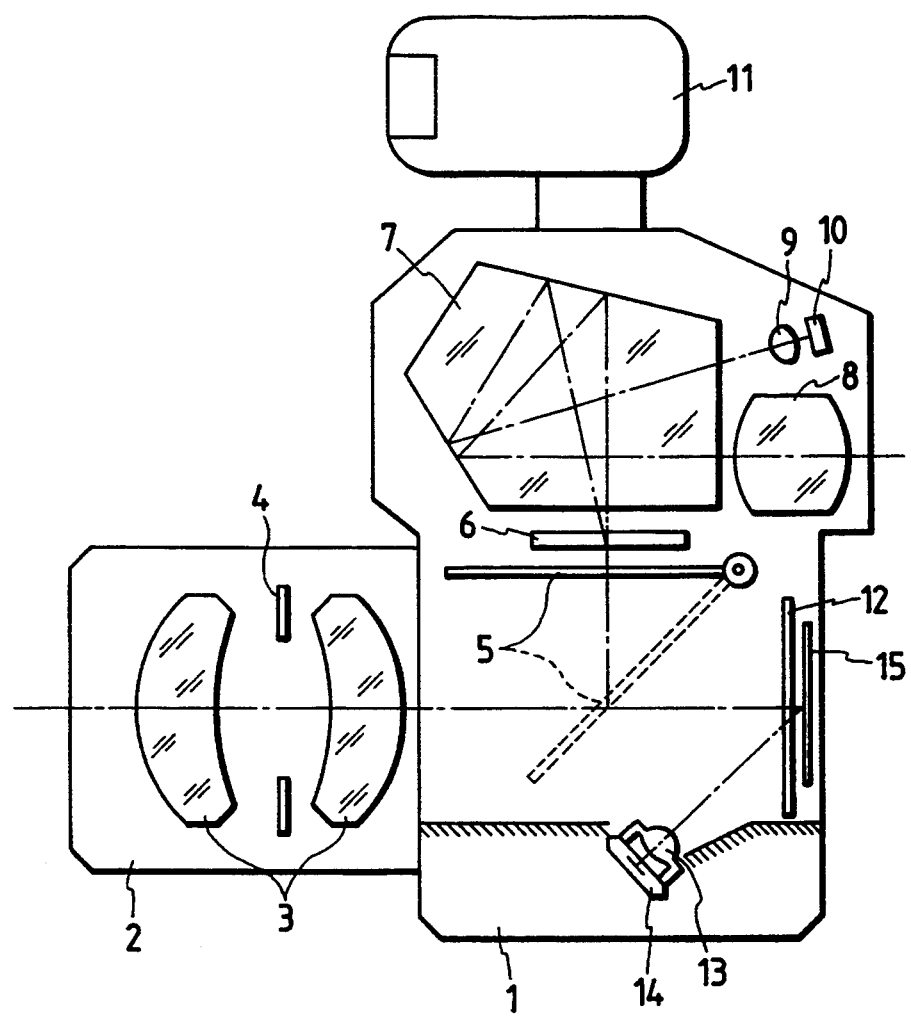
FIG. 5 is a sectional view of a camera having a conventional automatic flash control device.

FIG. 1 is a perspective view showing a photometry optical system. FIGS. 2A and 2B are plan views showing light-receiving portions to be used in a photometry mode for light, reflected by a shutter curtain (to be referred to as a shutter curtain photometry mode hereinafter) and in a photometry mode for light reflected by a film surface (to be referred to as a film surface photometry mode hereinafter). FIG. 3 is a block diagram showing a circuit of this embodiment, and FIG. 4 is a flow chart showing the operation of a CPU in FIG. 3.

Referring to FIG. 1, a photometry element 22 divisionally measures light reflected by a shutter curtain 12 and a film surface 15 via a focusing lens 21 using seven divided light-receiving portions 22a to 22g. The focusing lens 21 is constituted by four lenses 21a to 21d.

The focusing lens 21 is arranged to satisfy the following conditions.

That is, in the shutter curtain photometry mode, the lens 21d allows the light-receiving portion 22g to measure an area 12g, the lens 21b allows the light-receiving portions 22c and 22e to measure areas 12c and 12e, and the lens 21c allows the light-receiving portions 22d and 22f to measure areas 12d and 12f.

In the film surface photometry mode, the lens 21a allows the light-receiving portions 22a and 22b to measure areas 15a and 15b, the lens 21b allows the light-receiving portions 22c and 22e to measure areas 15c and 15e, and the lens 21c allows the light-receiving portions 22d and 22f to measure areas 15d and 15f.

In this manner, this embodiment pays attention to the fact that, when the photometry areas are displaced between the shutter curtain photometry mode and the film surface photometry mode, the central small photometry portion (12g, 15a) measures different areas. Thus, this embodiment takes a countermeasure against the displacement at only this portion.

As a method, the light-receiving portions corresponding to the central small photometry portion and the focusing lenses are switched between the shutter curtain photometry mode and the film surface photometry mode. More specifically, the light-receiving portion 22g and the focusing lens 21d are used in the shutter curtain photometry mode, and the light-receiving portion 22a and the focusing lens 21a are used in the film surface photometry mode.

FIGS. 2A and 2B summarize the light-receiving portions to be used in the shutter curtain photometry mode and in the film surface photometry mode. The central small portion is subjected to photometry using the light-receiving portion 22g in the shutter curtain photometry mode, as shown in FIG. 2A, and is subjected to photometry using the light-receiving portion 22a in the film surface photometry mode, as shown in FIG. 2B.

The operation of this embodiment will be described below with reference to FIGS. 3 and 4.

FIG. 3 is a block diagram showing a circuit according to an embodiment of the present invention.

An output from a photometry element 10 for stationary light photometry is logarithmically compressed by a known photometry circuit 33, and is then input to a CPU 31. The CPU 31 calculates a proper exposure value based on the input information, and supplies the proper exposure value to an exposure control circuit 36 consisting of a shutter and an aperture.

An output from a photometry element 22 for flashing photometry is integrated by a known flash control circuit 34, and is then input to the CPU 31. A flashing device 11 is controlled based on the input information.

An output signal from a distance measurement element 32 for focus detection is supplied to the CPU 31 through a known focus detection circuit 35. The CPU 31 calculates a defocus amount, and drives a focus adjustment lens of a taking lens 2 based on the calculated defocus amount.

An output from a release switch 30 is input to the CPU 31.

The algorithm of the CPU 31 in FIG. 3 will be explained below with reference to the flow chart shown in FIG. 4.

In step S1, an output signal from the release switch 30 is received. If it is determined that the release switch 30 is half-pushed, the flow advances to step S2.

In step S2, the light-receiving portions to be subjected to flashing photometry are set to be those (22g, 22b, 22c, 22d, 22e, and 22f) for the shutter curtain photometry mode, and the flow advances to step S3.

In step S3, an output signal from the release switch 30 is received. If it is determined that the release switch is full-pushed, the flow advances to step S4.

In step S4, an output signal from the photometry element 10 for stationary light photometry is received, and the flow advances to step S5.

In step S5, an exposure calculation is performed using the information of the stationary light measured in step S4 so as to calculate an exposure value $BV_{ANS}$ to be controlled, and the flow advances to step S6.

In step S6, a shutter speed TV and an aperture value AV are determined according to a known program graph on the basis of the exposure value $BV_{ANS}$ calculated in step S5, and the flow advances to step S7.

In step S7, an output signal from the distance measurement element 32 for focus detection is received to detect information (AF information) associated with a focal point, and the flow advances to step S8.

Figure 6:
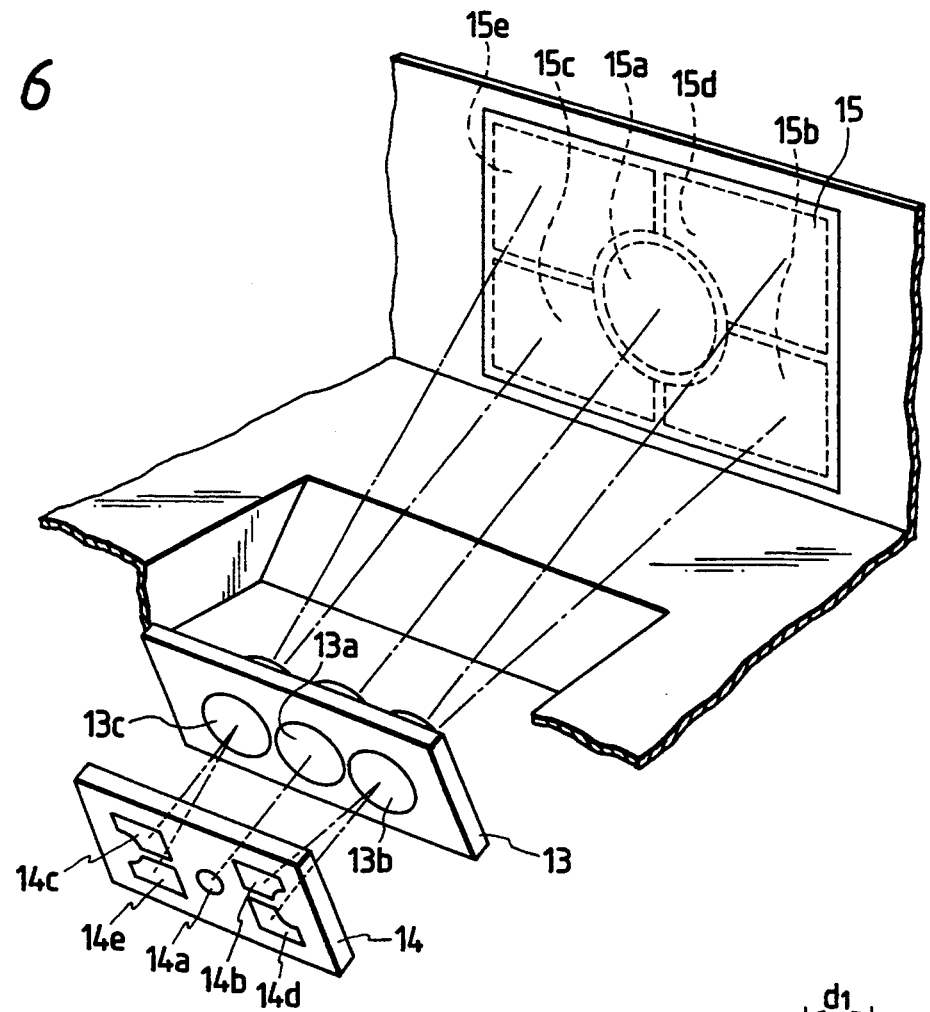
FIG. 6 is a perspective view showing details of a focusing lens and a photometry element.
Figure 7:
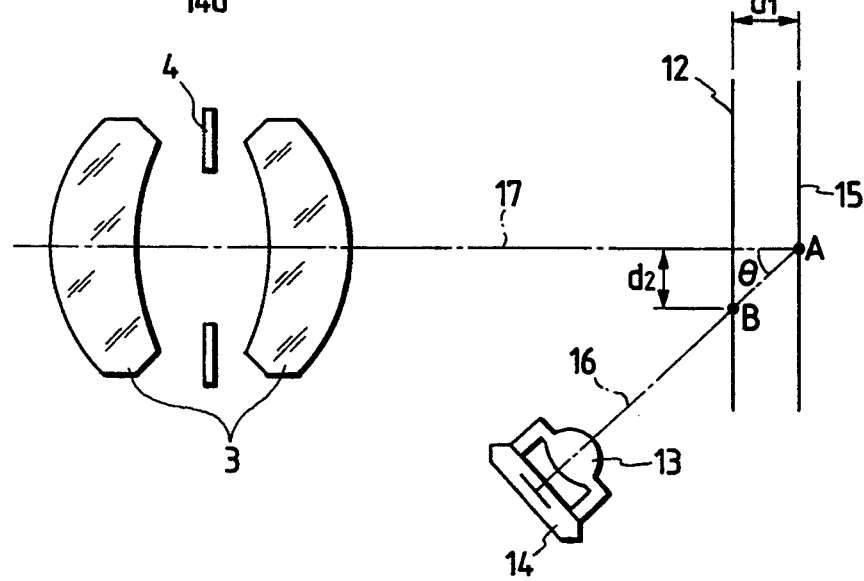
FIG. 7 is a view showing an optical system portion for flashing photometry.
Figure 8:
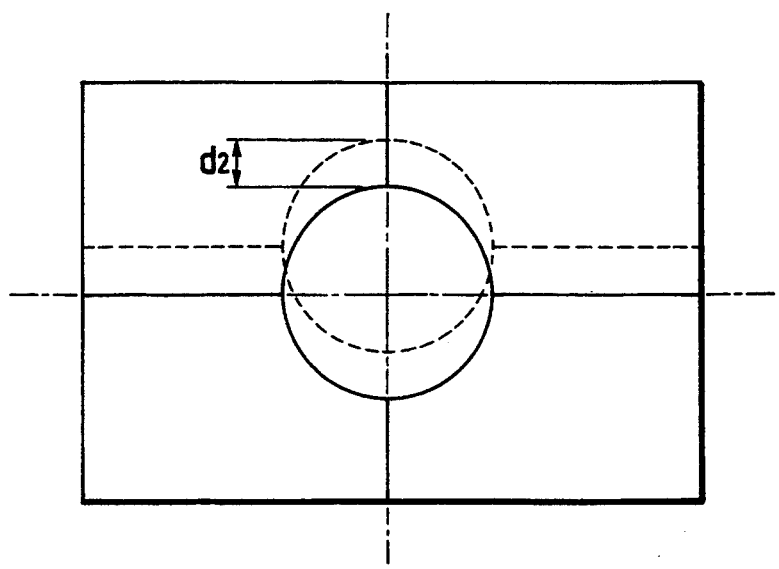
FIG. 8 is a first view for explaining a displacement between photometry areas in a shutter curtain photometry mode and a film surface photometry mode.
Figure 9:
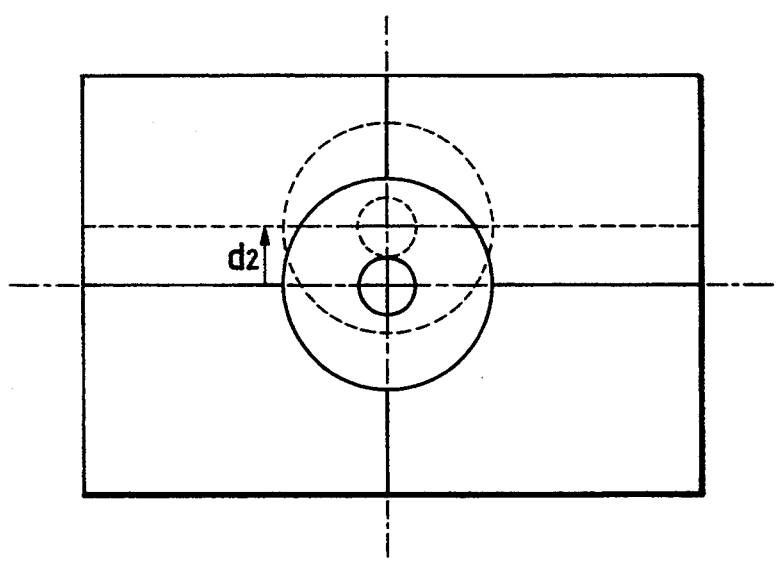
FIG. 9 is a second view for explaining a displacement between photometry areas in the shutter curtain photometry mode and the film surface photometry mode.

In step S8, an output signal is output to the exposure control circuit 36 to escape the main mirror 5 to the solid line position in FIG. 6 and to stop down the aperture 4 to the aperture value AV determined in step S6. Thereafter, the flow advances to step S9.

In step S9, an output signal is output to the flashing device 11 to perform preliminary flashing, and the preliminary-flashing light is measured by the light-receiving portions (22g, 22b, 22c, 22d, 22e, and 22f) for the shutter curtain photometry mode. Thereafter, the flow advances to step S10.

In step S10, area candidates to be cut in the main flashing mode are extracted on the basis of the photometry result of preliminary flashing measured in step S9, and the flow advances to step S11. The area candidates to be cut in the main flashing mode include two types of areas, i.e., a Hi cut area where the reflectance of an object is too high, and a Lo cut area where the reflectance is too low.

In step S11, the light-receiving portions to be subjected to flashing photometry are set to be those (22a, 22b, 22c, 22d, 22e, and 22f) for the film surface photometry mode, and the flow advances to step S12.

In step S12, a flash control area in the main flashing mode is determined on the basis of information of area candidates to be cut in the main flashing mode extracted in step S10. Furthermore, a correction amount (flash control correction amount) from a reference flash control level is also determined. Note that the algorithm portions in steps S10 and S12 are described in detail in Japanese Patent Application No. 3-160140 filed by the present applicant, and a detailed description thereof will be omitted here.

In step S13, an output signal is output to the flashing device 11 to start main flashing, and main flashing light is measured by the light-receiving portions (22a, 22b, 22c, 22d, 22e, and 22f) for the film surface photometry mode. Thereafter, the flow advances to step S14.

If it is determined in step S14 that the sum of divisional photometry values measured in step S13 has reached the flash control level corrected by the flash control correction amount determined in step S11, an output signal is output to the flashing device 11 to stop main flashing, thus ending this processing.

Figure 10:
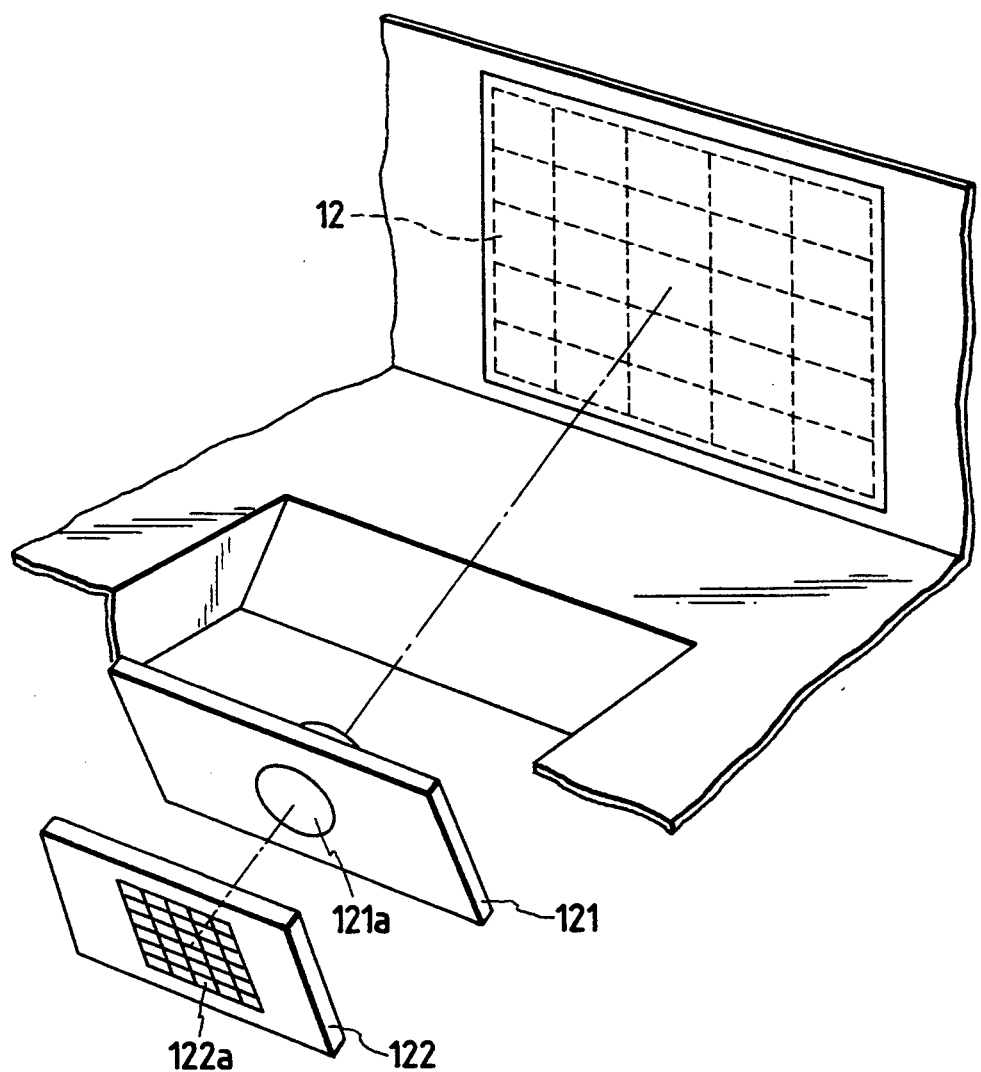
FIG. 10 is a perspective view showing a photometry optical system according to the second embodiment of the present invention.
Figure 11A:
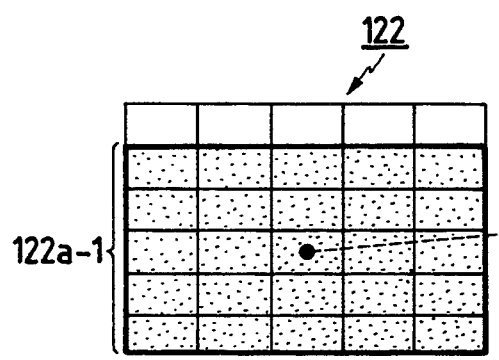
FIGS. 11A and 11B are plan views for explaining photometry areas selectively used in a shutter curtain photometry mode and a film surface photometry mode in the second embodiment of the present invention.
Figure 11B:
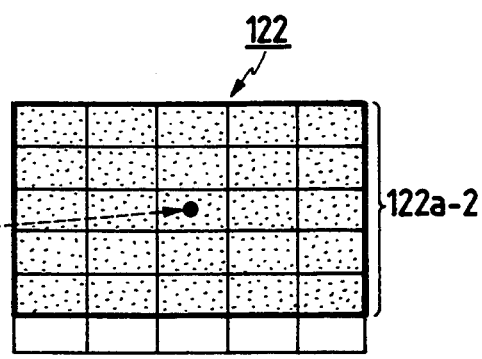

FIG. 10, and FIGS. 11A and 11B show the second embodiment of the present invention.

FIG. 10 shows a photometry optical system, and the same reference numerals in FIG. 10 denote the same parts as in FIG. 1. A photometry element 122 has a light-receiving portion 122a divided into 5 columns (horizontal direction) × 6 rows (vertical direction), i.e., 30 areas. The photometry element 122 divisionally measures light reflected by a shutter curtain 12 and a film surface 15 (which are the same as those in FIG. 1) via a focusing lens 121a.

In a shutter curtain photometry mode, as shown in FIG. 11A, a photometry operation is performed using lower (the bottom side of a camera body 1) five rows of the six rows in the vertical direction as a light-receiving portion 122a-1. In a film surface photometry mode, as shown in FIG. 11B, a photometry operation is performed using upper (the pentagonal prism 7 side of the camera body 1) five rows of the six rows in the vertical direction as a light-receiving portion 122a-2. Thus, the photometry area of an object field in the shutter curtain photometry mode becomes equivalent to that in the film surface photometry mode.

Figure 12A:
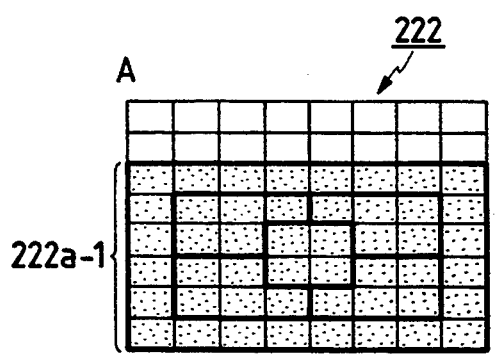
FIGS. 12A and 12B are plan views for explaining photometry areas selectively used in a shutter curtain photometry mode and a film surface photometry mode in the third embodiment of the present invention.
Figure 12B:
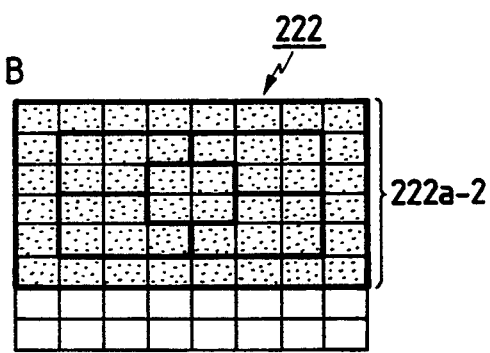

FIGS. 12A and 12B show the third embodiment of the present invention.

In the third embodiment, a photometry element has a light-receiving portion divided into 8 columns (horizontal direction) × 8 rows (vertical direction), i.e., 64 areas.

In the shutter curtain photometry mode, as shown in FIG. 12A, a photometry operation is performed using 48 pixels in lower (the bottom side of a camera body 1) six rows of the eight rows in the vertical direction as a light-receiving portion 222a-1. In a film surface photometry mode, as shown in FIG. 12B, a photometry operation is performed using 48 pixels in upper (the pentagonal prism 7 side of the camera body 1) six rows of the eight rows in the vertical direction as a light-receiving portion 222a-2. Thus, the photometry area of an object field in the shutter curtain photometry mode becomes equivalent to that in the film surface photometry mode.

In a calculation mode, the 48 pixels can be processed as a total of six areas, i.e., central, middle, and peripheral areas, as shown in FIGS. 12A and 12B.

In the second and third embodiments, a CCD, MOS, and the like are suitably used as a photometry element.

As described above, according to the present invention, since the displacement of photometry areas caused by the difference between the positions of the shutter curtain and the film surface is corrected, the identity between the photometry areas in the preliminary flashing mode and the main flashing mode can be assured, and a high-performance automatic flash control device of a camera can be provided.

What is claimed is:

1. An automatic flash control device of a camera, comprising:
    flashing means for performing preliminary flashing and main flashing;
    first photometry means having a plurality of light-receiving areas for measuring a light beam reflected by an object field and reflected by a shutter curtain via a taking lens upon preliminary flashing from said flashing means before exposure; and
    second photometry means having a plurality of light-receiving areas for measuring a light beam reflected by the object field and reflected by a film surface via the taking lens upon main flashing from said flashing means during exposure;
    wherein said second photometry means has at least one light-receiving area which is different from the light-receiving areas of said first photometry means.

2. A device according to claim 1, wherein at least one light-receiving area of said first photometry means and at least one different light-receiving area of said second photometry means are used for a photometry operation of an identical portion of the object field.

3. A device according to claim 1, wherein said first and second photometry means are formed on a single chip.

4. A device according to claim 2, wherein each of said first and second photometry means has six photometry areas obtained by dividing the object field into six portions.

5. A device according to claim 4, wherein the six photometry areas include an area corresponding to a central portion of the object field and areas corresponding to other portions of the object field, and said first and second photometry means measure light from the same central portion, and the same other portions.

6. A device according to claim 2, wherein each of said first and second photometry means has a plurality of light-receiving elements arranged in a matrix pattern so as to measure light at photometry areas obtained by dividing the object field into a plurality of portions.

7. A device according to claim 1, wherein said device includes a plurality of light-receiving element groups arranged in a matrix pattern, said first photometry means measures light at a plurality of photometry areas obtained by dividing the object field using some elements of said light-receiving element groups, said second photometry means measures light at a plurality of photometry areas obtained by dividing the object field using some elements of said light-receiving element groups, and some of the light-receiving elements used by said first photometry means overlap the light-receiving elements used by said second photometry means.

8. A device according to claim 7, wherein the plurality of photometry areas of said first photometry means and the plurality of photometry areas of said second photometry means measure light from the same corresponding portions of the object field.

9. An automatic flash control device of a camera, comprising:
   flashing means for performing preliminary flashing and main flashing;
   first photometry means having a first light receiving portion for measuring a light beam reflected by an object field and reflected by a shutter curtain via a taking lens upon preliminary flashing from said flashing means before exposure; and
   second photometry means having a second light receiving portion, which is different from said first light receiving portion, for measuring a light beam reflected by an object field and reflected by a film surface via the taking lens upon main flashing from said flashing means during exposure.

10. An automatic flash control device of a camera, comprising:
    a photometry device including a plurality of light-receiving elements disposed at a bottom of the camera; and
    a microcomputer which is electrically connected to said plurality of light-receiving elements;
    wherein said microcomputer selects light-receiving elements from said plurality of light-receiving elements for use in preliminary flashing and for use in main flashing, at least one of the selected light-receiving elements selected for use in preliminary flashing being different from the light-receiving elements selected for use in main flashing.

11. An automatic flash control device according to claim 10, wherein said photometry device measures light reflected by an object field and reflected by a shutter curtain via a taking lens upon preliminary flashing and measures light reflected by the object field and reflected by a film surface via the taking lens upon main flashing, and wherein the selection of light-receiving elements by said microcomputer compensates for a shift in corresponding points in a pattern of light reflected by said shutter curtain and a pattern of light reflected by said film surface due to displacement of said shutter curtain relative to said film surface in a direction of an optical axis of said taking lens.

* * * * *